US010495784B2

(12) United States Patent
Shimizu et al.

(10) Patent No.: US 10,495,784 B2
(45) Date of Patent: Dec. 3, 2019

(54) BALLOON-LAUNCHING APPARATUS

(71) Applicants: MEISEI ELECTRIC CO., LTD., Isesaki-shi, Gunma (JP); IHI AEROSPACE ENGINEERING CO., LTD., Tomioka-shi, Gunma (JP)

(72) Inventors: Kensaku Shimizu, Isesaki (JP); Yasomi Oike, Isesaki (JP); Hirotake Morisaki, Tomioka (JP); Tomohiko Naide, Tomioka (JP)

(73) Assignees: MEISEI ELECTRIC CO., LTD., Isesak-Shi, Gunma (JP); IHI AEROSPACE ENGINEERING CO., LTD., Tomioka-Shi, Gunma (JP)

( * ) Notice: Subject to any disclaimer, the term of this patent is extended or adjusted under 35 U.S.C. 154(b) by 220 days.

(21) Appl. No.: 15/507,594

(22) PCT Filed: Jan. 19, 2016

(86) PCT No.: PCT/JP2016/000240
§ 371 (c)(1),
(2) Date: Feb. 28, 2017

(87) PCT Pub. No.: WO2017/125963
PCT Pub. Date: Jul. 27, 2017

(65) Prior Publication Data
US 2017/0329047 A1    Nov. 16, 2017

(51) Int. Cl.
*G01W 1/08* (2006.01)
*B64F 1/04* (2006.01)
(Continued)

(52) U.S. Cl.
CPC ............. *G01W 1/08* (2013.01); *B64B 1/40* (2013.01); *B64B 1/62* (2013.01); *B64F 1/04* (2013.01);
(Continued)

(58) Field of Classification Search
CPC . G01W 1/08; B64B 1/005; B64B 1/58; B64B 1/62; B64F 1/04; B64F 1/22; B64F 1/222; B64C 2201/201; B64C 2201/208
See application file for complete search history.

(56) References Cited

U.S. PATENT DOCUMENTS 5,548,283 A * 8/1996 Martin .................... G01W 1/08
340/870.01
5,636,480 A * 6/1997 Lauritsen ................. B64F 1/14
244/33
(Continued)

FOREIGN PATENT DOCUMENTS

EP          2350703 A1    8/2011
JP      2006-036104 A    2/2006
(Continued)

OTHER PUBLICATIONS

Ohio-class Boomer Submarine. (Apr. 2000). National Museum of American History, Washington, DC. Fast Attacks and Boomers: Submarines in the Cold War. (n.d.). Retrieved from:https://americanhistory.si.edu/subs/const/anatonny/boomers/cutaway.html.*

(Continued)

*Primary Examiner* — Joseph W Sanderson
(74) *Attorney, Agent, or Firm* — Manabu Kanesaka

(57) ABSTRACT

A balloon-launching apparatus includes a plurality of housing sections each formed in a box shape having an opening that opens in an upper part thereof and configured to house a balloon. The housing section launches the balloon from the opening, and the plurality of housing sections is arranged in a matrix shape.

6 Claims, 8 Drawing Sheets

(51) Int. Cl.
*B64B 1/40* (2006.01)
*B64B 1/62* (2006.01)
(52) U.S. Cl.
CPC .. *B64C 2201/022* (2013.01); *B64C 2201/201* (2013.01)

(56) References Cited

U.S. PATENT DOCUMENTS

| | | | | |
|---|---|---|---|---|
| 5,687,930 | A * | 11/1997 | Wagner | B64F 1/125 |
| | | | | 244/116 |
| 5,850,988 | A * | 12/1998 | Aurilio | B64B 1/58 |
| | | | | 244/31 |
| 5,884,862 | A * | 3/1999 | Aurilio | B64B 1/40 |
| | | | | 244/1 TD |
| 5,895,010 | A * | 4/1999 | Aurilio | G01W 1/08 |
| | | | | 244/1 TD |
| 7,275,496 | B2 * | 10/2007 | French | G01W 1/08 |
| | | | | 116/210 |
| 8,910,905 | B2 * | 12/2014 | DeVaul | B64B 1/40 |
| | | | | 244/31 |
| 9,540,121 | B2 * | 1/2017 | Byers | B64C 39/024 |
| 9,701,425 | B2 * | 7/2017 | Lee | G08G 5/0013 |
| 9,718,564 | B1 * | 8/2017 | Beckman | G06Q 10/0832 |
| 9,776,717 | B2 * | 10/2017 | Spinelli | B64C 39/024 |
| 10,232,955 | B2 * | 3/2019 | Benedetto | B64F 1/04 |
| 10,246,176 | B2 * | 4/2019 | Leinonen | G01W 1/08 |
| 2003/0027652 | A1 * | 2/2003 | Chamberlain | B64B 1/58 |
| | | | | 473/115 |
| 2014/0042042 | A1 * | 2/2014 | DeVaul | B64B 1/40 |
| | | | | 206/216 |
| 2016/0009413 | A1 * | 1/2016 | Lee | B64F 1/007 |
| | | | | 701/16 |
| 2016/0200438 | A1 * | 7/2016 | Bokeno | B64C 39/024 |
| 2016/0244187 | A1 * | 8/2016 | Byers | B64C 39/024 |
| 2016/0340015 | A1 * | 11/2016 | Leinonen | G01W 1/08 |
| 2016/0364989 | A1 * | 12/2016 | Speasl | G08G 5/0034 |
| 2017/0096222 | A1 * | 4/2017 | Spinelli | B64C 39/024 |
| 2018/0239056 | A1 * | 8/2018 | Shimizu | G01W 1/08 |

FOREIGN PATENT DOCUMENTS

| | | |
|---|---|---|
| JP | 2006-038725 A | 2/2006 |
| WO | 2010/000942 A1 | 1/2010 |

OTHER PUBLICATIONS

PCT International Search Report of PCT/JP2016/000240 "PCT/ISA/237 & PCT/ISA/210" in Japanese.

PCT/ISA/237, "Written Opinion of the International Searching Authority for International Application No. PCT/JP2016/00240," dated Apr. 12, 2016.

PCT/IB/310, "Notification Concerning Documents Transmitted for International Application No. PCT/JP2016/00240," Jun. 7, 2017.

Europe Patent Office, "Search Report for European Patent Application No. 16838082.2," dated Aug. 5, 2019.

* cited by examiner

BALLOON-LAUNCHING APPARATUS

RELATED APPLICATIONS

The present application is National Phase of International Application No. PCT/JP2016/000240 filed Jan. 19, 2016, the disclosure of which is hereby incorporated by reference herein in its entirety.

TECHNICAL FIELD

The present invention relates to a balloon-launching apparatus that automatically launches a weather observation balloon without the assistance of an attendant.

BACKGROUND ART

As methods for aerological observation, there is known a method in which an observation balloon hanging a radiosonde is sent up to observe atmospheric temperature and wind direction, for example, in the sky by the radiosonde. In this method, the radiosonde in the sky wirelessly transmits observed information and a receiver on the ground receives the observed information.

The present applicant has developed balloon-launching apparatuses that automatically launch observation balloons without the assistance of an attendant (Patent Literature 1, for example). In such a conventional balloon-launching apparatus, cartridges for holding balloons are placed evenly in a circumferential direction of a rotary table.

CITATION LIST

Patent Literature

Patent Literature 1: JPA2006-038725

SUMMARY OF INVENTION

Technical Problem

In the conventional balloon-launching apparatus, the diameter of the rotary table needs to increase in order to increase the number of the cartridges. In the conventional balloon-launching apparatus, the increase in the diameter of the rotary table leads to an increase in dead space at a central part of the rotary table and thus an increase in the size of the apparatus.

It is an object of the present invention to provide a balloon-launching apparatus capable of reducing an increase in the size of the apparatus when a large number of housing sections for housing observation balloons are provided.

Solution to Problem

A balloon-launching apparatus of the present invention includes a plurality of housing sections each formed in a box shape having an opening that opens in an upper part thereof and configured to house a balloon, the housing section launching the balloon from the opening, and is characterized in that the plurality of housing sections are arranged in a matrix shape.

Due to the matrix arrangement of the housing sections, the present invention can reduce the creation of dead space even when a large number of the housing sections are provided and can thus reduce an increase in the size of the balloon-launching apparatus.

The balloon-launching apparatus of the present invention may include a balloon-launching port for launching the balloon to the outside of the balloon-launching apparatus above the opening, and all the openings may be positioned within the balloon-launching port in a planar view.

Balloon launching can be performed from any housing section in the present invention. Thus, the present invention can eliminate the need for high machine accuracy that is required when the housing section is moved to a balloon-launching position.

The balloon-launching apparatus of the present invention may include a net suspended from an inner side of the balloon-launching port toward an outer side of a group of the openings arranged in the matrix shape.

If an inner wall of a space where the housing sections are disposed becomes wet, trouble may occur, e.g., the balloon may be stuck to the inner wall when the balloon abuts against the inner wall during the inflation of the balloon. In the balloon-launching apparatus of the present invention, the net having a small area of contact with the balloon is set up to surround a flying path of the balloon from the housing section side to the balloon-launching port side. This can prevent the occurrence of trouble such as the balloon being stuck to the inner wall.

In the balloon-launching apparatus of the present invention, the housing sections may be canisters each capable of being disposed independently and the canister may include a cover for blocking the opening and an opening and closing mechanism for opening and closing the cover.

If the balloon wets, the balloon may have a difficulty in inflating normally or the balloon may degrade. Since the canister includes the cover in the present invention, adverse effects due to the wetting of the balloon can be prevented from occurring.

The balloon-launching apparatus of the present invention may include a container having a balloon-launching chamber and a preparation chamber divided by a partition. The container may include a communicating opening provided below the partition for allowing the balloon-launching chamber and the preparation chamber to be in communication with each other, and a balloon-launching port provided on a top surface of the balloon-launching chamber for launching the balloon toward the outside. The balloon-launching apparatus of the present invention may also include: a rail extending over the balloon-launching chamber and the preparation chamber through the communicating opening; a holding member for integrally holding the plurality of canisters; and a moving mechanism for moving the holding member along the rail.

In the present invention, the canisters can be collectively moved to the preparation chamber, and the maintenance of the canisters, such as the replacement of the canisters, can be performed in the preparation chamber. Since the inside of the balloon-launching apparatus is divided into a room used solely for balloon launching and a room used solely for the maintenance of the canisters in the present invention, workability for an operator can be improved.

DESCRIPTION OF EMBODIMENTS

Hereinafter, embodiments will be described with reference to the drawings.

Figure 1:
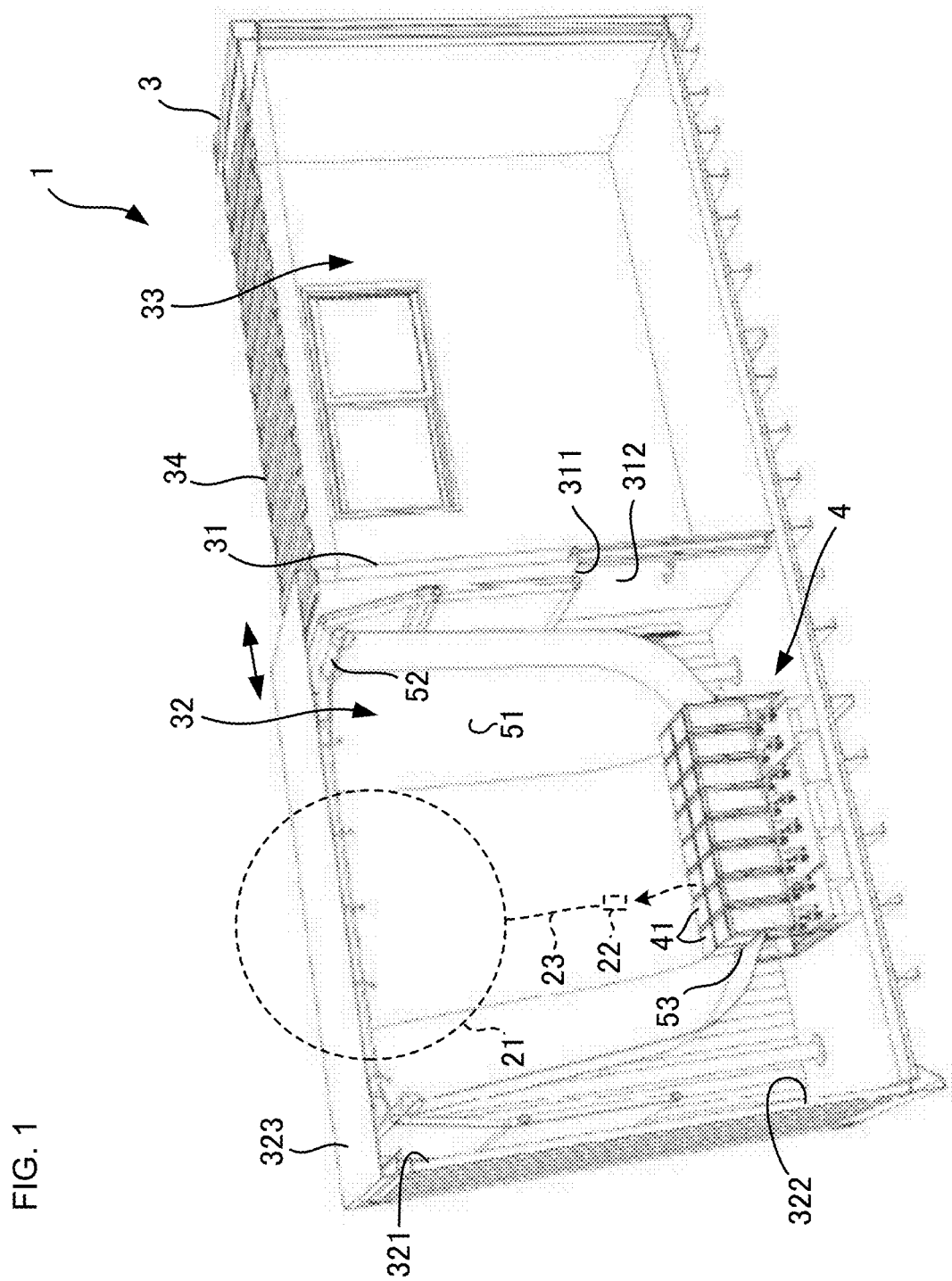
FIG. 1 is a perspective view illustrating the inside of a balloon-launching apparatus.

FIG. 1 is a perspective view illustrating the inside of a balloon-launching apparatus 1.

The balloon-launching apparatus 1 automatically launches an observation balloon 21 hanging a radiosonde 22 with a rope 23 without the assistance of an attendant and receives observed information, such as atmospheric temperature and wind direction, obtained in the sky by the radiosonde 22.

The balloon-launching apparatus 1 uses a maritime container 3. A partition 31 divides the inside of the container 3 into a balloon-launching chamber 32 and a preparation chamber 33. The balloon-launching chamber 32 and the preparation chamber 33 are in communication with each other through an opening 311 (communicating opening) provided under the partition 31. The partition 31 has a door 312 for opening and closing the opening 311.

A canister module 4 for launching the balloon 21 is placed in the balloon-launching chamber 32.

A roof is not installed above the balloon-launching chamber 32 at a top surface portion 34 of the container 3, and a balloon-launching port 321 is formed at the top of the balloon-launching chamber 32. A sliding roof 323 closes the balloon-launching port 321.

A net 51 made of fibers is suspended from the inner side of the balloon-launching port 321 toward the outer side of the canister module 4. The net 51 is arranged in a tubular shape to cover inner walls 322 of the balloon-launching chamber 32. An upper end of the net 51 hangs from a rail 52 provided on the inner side of the balloon-launching port 321. The rail 52 is in the form of a ring and has a rectangular shape in a planar view.

A lower end of the net 51 is connected to a rail 53 provided on the outer side of the canister module 4. The rail 53 is in the form of a ring and has a rectangular shape in a planar view. The rail 53 is attached to the canister module 4. The rail 53 may be provided to surround the canister module 4.

Figure 2:
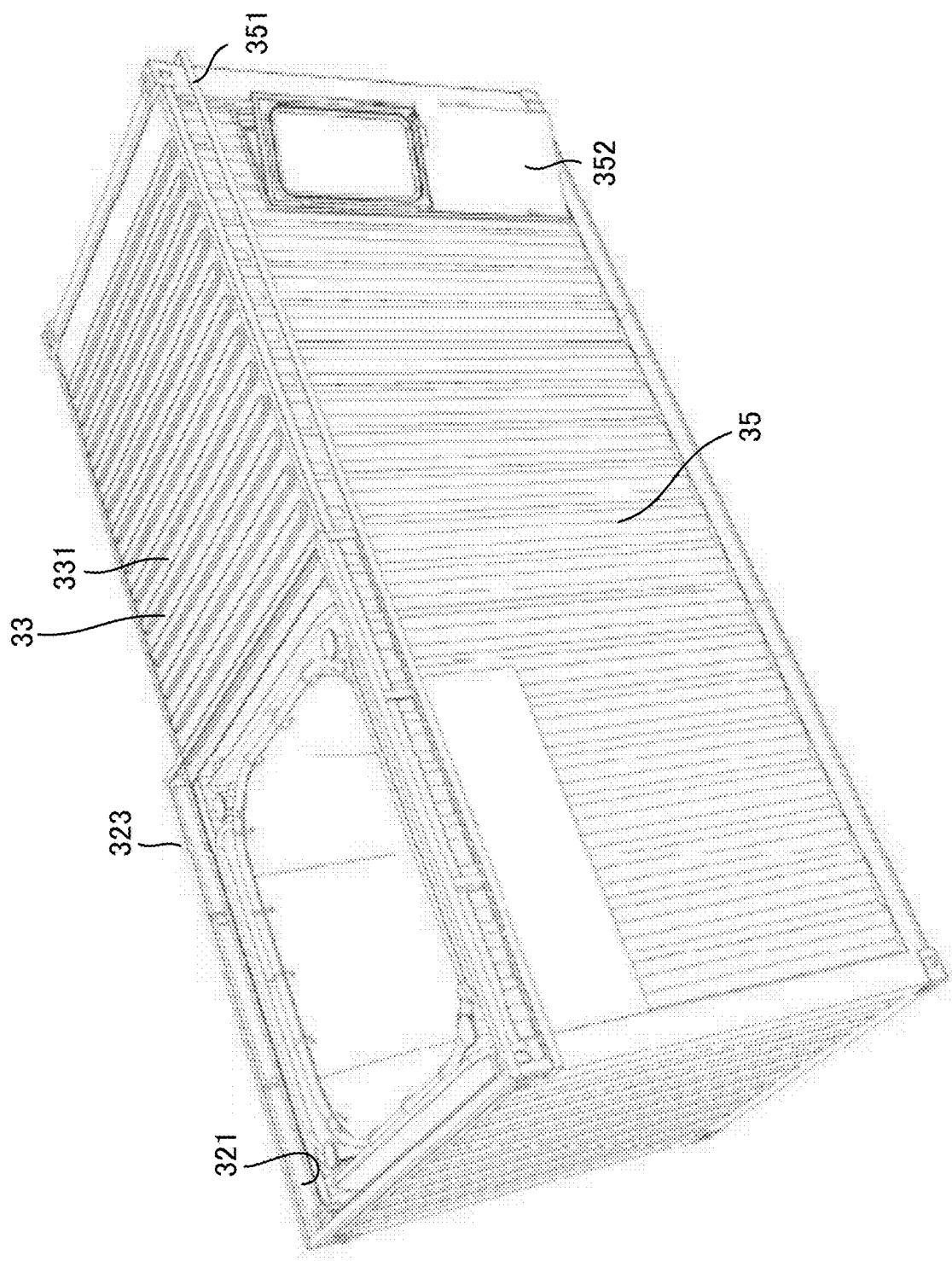
FIG. 2 is a perspective view illustrating the balloon-launching apparatus as seen from a viewpoint opposite to that of FIG. 1.

FIG. 2 is a perspective view illustrating the balloon-launching apparatus 1 as seen from a viewpoint opposite to that of FIG. 1.

Figure 4:
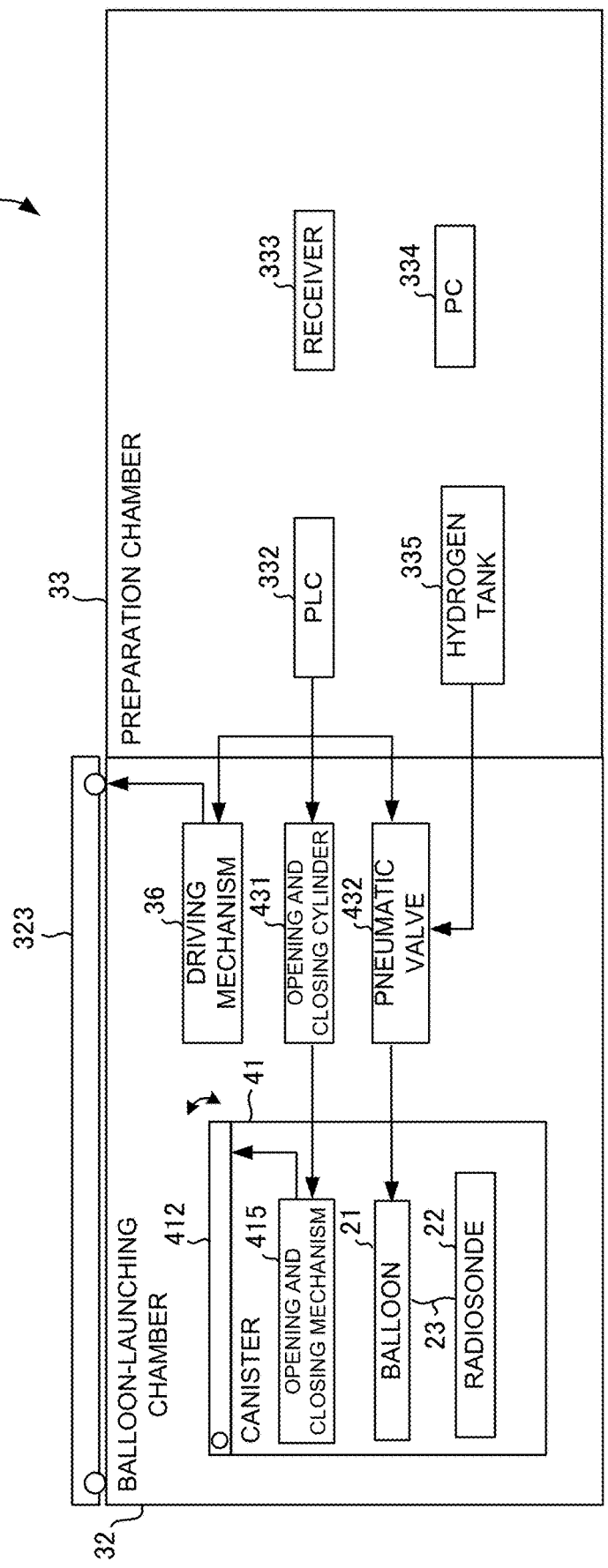
FIG. 4 is a block diagram illustrating a configuration associated with the control of the balloon-launching apparatus.

An upper part of each of side walls 35 in a longitudinal direction of the container 3 is provided with a rail 351 for guiding the sliding roof 323 in the longitudinal direction of the container 3. The sliding roof 323 is driven by a driving mechanism 36 (FIG. 4). The sliding roof 323 moves between a closed position of FIG. 2 for closing the balloon-launching port 321 and an open position for covering a top surface 331 of the preparation chamber 33. The side wall 35 includes a door 352 for an operator to enter or leave the preparation chamber 33.

Figure 3:
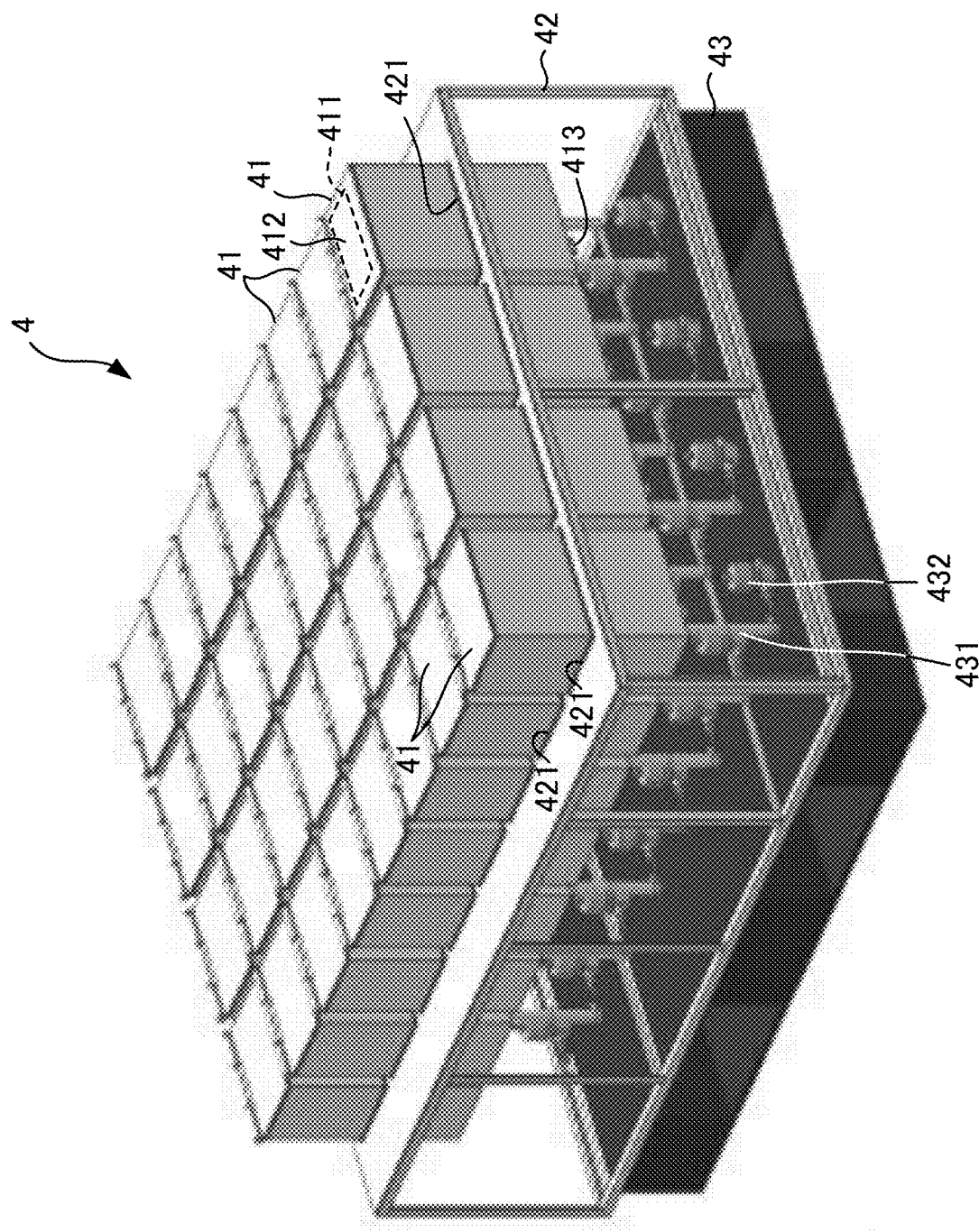
FIG. 3 is a perspective view of a canister module.

FIG. 3 is a perspective view of the canister module 4.

The canister module 4 includes a canister 41 (housing section), a frame 42 (holding member), and a pallet 43 (holding member). The canister 41 has a box shape and a plurality of the canisters 41 are provided. The canister 41 houses the balloon 21 and the radiosonde 22 connected to the balloon 21 via the rope 23. The canisters 41 are arranged in a matrix shape of four columns by eight rows. The matrix shape refers to a state in which the canisters 41 are regularly arranged in a lattice shape in a plane.

The canister 41 includes an opening 411 that opens on the upper side thereof. The canister 41 includes a cover 412 for opening and closing the opening 411. A gas nozzle 413 is provided on a lower surface of the canister 41. Hydrogen to be filled into the balloon is sent to the gas nozzle 413.

The frame 42 is placed on the pallet 43. The frame 42 has openings 421 arranged in four columns by eight rows. The canisters 41 are fit in the openings 421 and removably attached to the frame 42. The frame 42 integrally holds all the canisters 41 with the canisters 41 being suspended in the air above the pallet 43. The holding member for integrally holding the plurality of canisters 41 is configured to include the frame 42 and the pallet 43. An opening and closing cylinder 431 and a pneumatic valve 432 are provided on the pallet 43 for each of the canisters 41. The opening and closing cylinder 431 drives the cover 412. The pneumatic valve 432 connects with the gas nozzle 413 to perform and stop the supply of hydrogen to the balloon 21.

FIG. 4 is a block diagram illustrating a configuration associated with the control of the balloon-launching apparatus 1.

Figure 5:
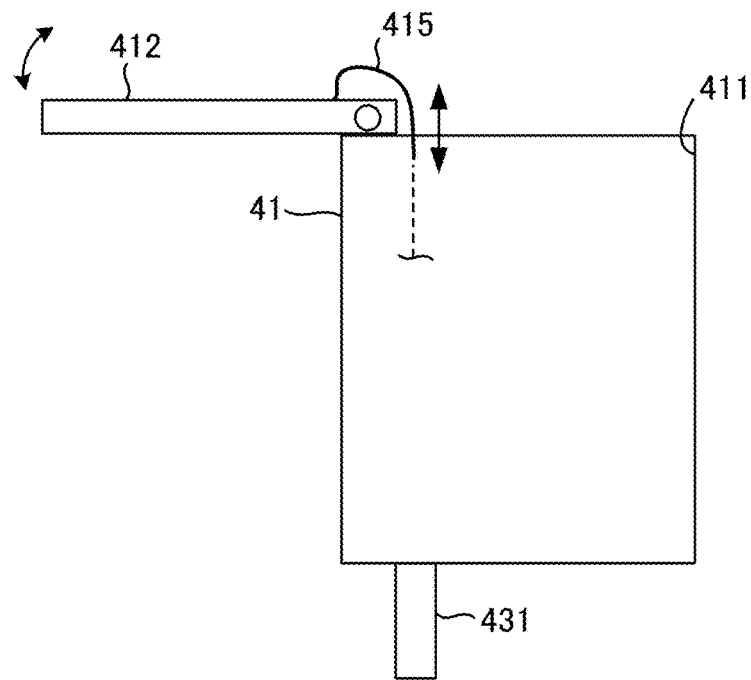
FIG. 5 is a schematic view illustrating an opening and closing mechanism.

A programmable logic controller (PLC) 332, a receiver 333, a personal computer (PC) 334, and a hydrogen tank 335 are placed in the preparation chamber 33. The PLC 332 drives the sliding roof 323 via the driving mechanism 36. The PLC 332 drives an opening and closing mechanism 415 in the canister 41 by the opening and closing cylinder 431 to open and close the cover 412 of the canister 41 (see FIG. 5). The hydrogen tank 335 stores hydrogen to be sent to the balloon 21 and connects with the pneumatic valve 432. The PLC 332 opens and closes the pneumatic valve 432 to perform and stop the supply of hydrogen to the balloon 21.

Figure 6:
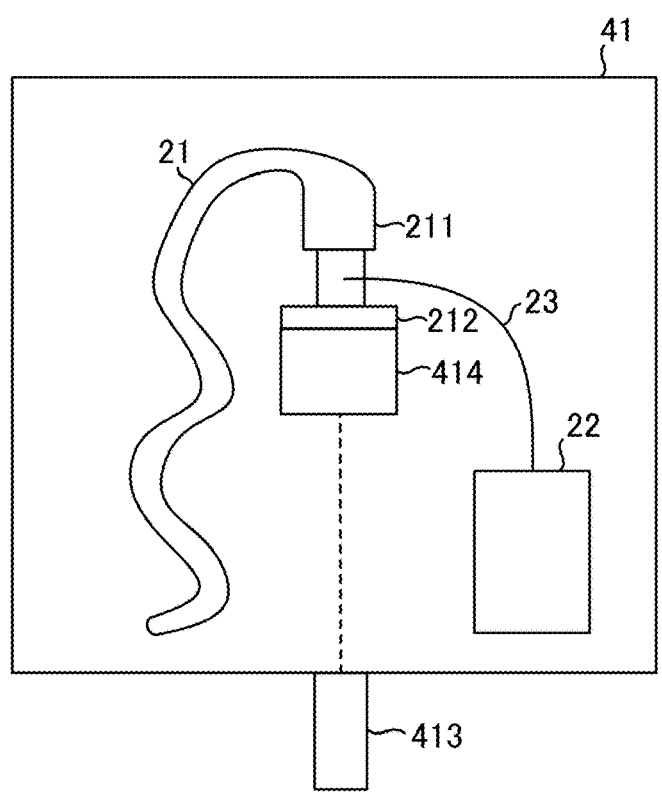
FIG. 6 is a schematic view illustrating the inside of a canister.

FIG. 6 is a schematic view illustrating the inside of the canister 41.

The balloon 21 in an uninflated state is housed in the canister 41. A connecting section 212 connects with a neck 211 of the balloon 21. One end of the rope 23 connects with the connecting section 212 and the other end thereof connects with the radiosonde 22. The canister 41 houses a pull-out mechanism 414 that connects with the gas nozzle 413. The pull-out mechanism 414 connects with the connecting section 212 of the balloon 21 and sends hydrogen to the balloon 21. Once the balloon 21 obtains a predetermined amount of buoyancy, the pull-out mechanism 414 separates off the connecting section 212.

Figure 7:
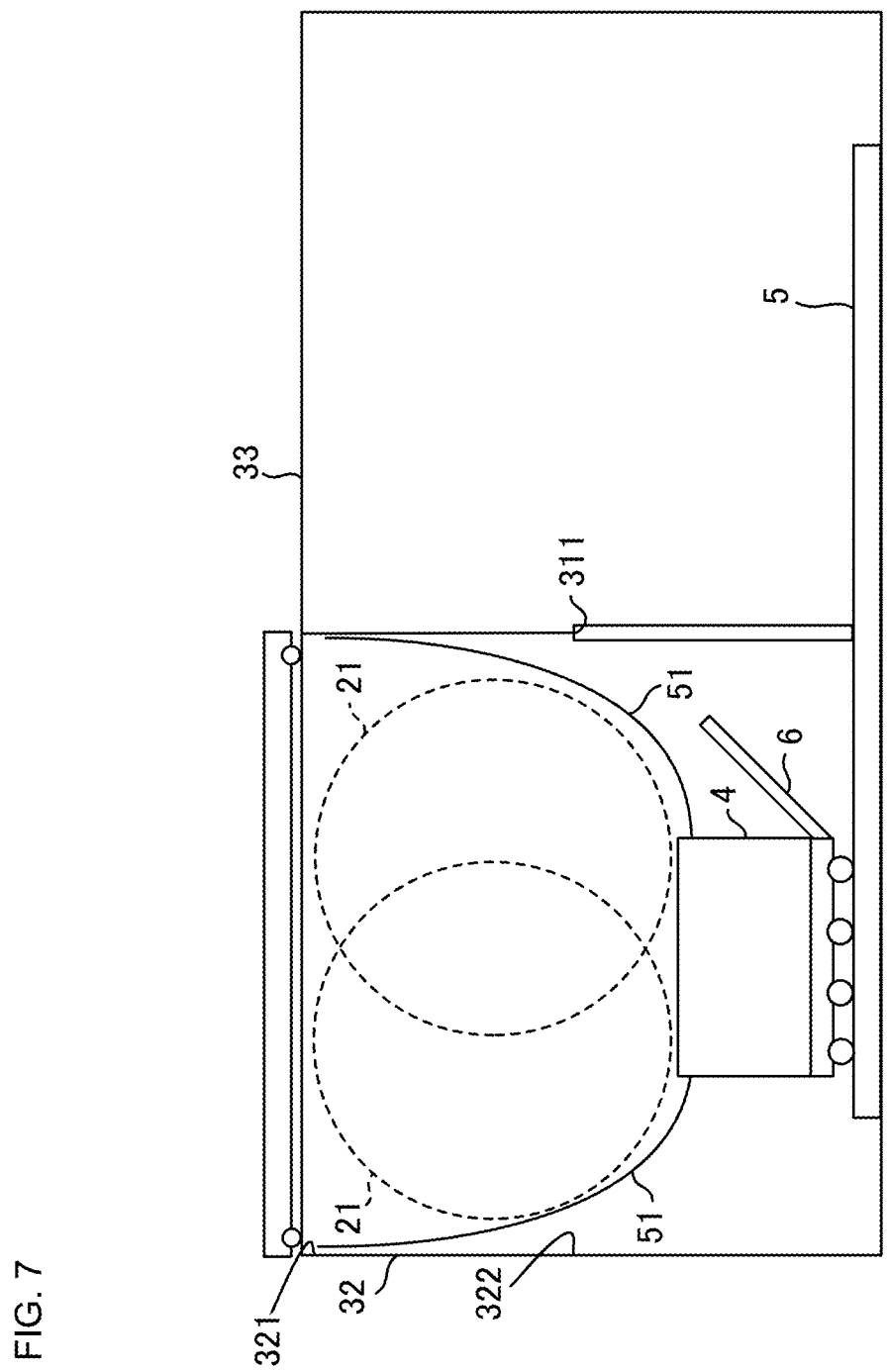
FIG. 7 is a side view schematically illustrating a mechanism for moving the canister module.

FIG. 7 is a side view schematically illustrating a configuration for moving the canister module 4.

In the balloon-launching chamber 32 and the preparation chamber 33, there are provided rails 5 extending over the balloon-launching chamber 32 and the preparation chamber 33 through the opening 311. The canister module 4 is placed on a carriage 6 (moving mechanism) that runs on the rails 5. The carriage 6 moves the canister module 4 along the rails 5. An operator can move the carriage 6 to transfer the canister module 4 between the balloon-launching chamber 32 and the preparation chamber 33. The size of the balloon 21 is set to a size preventing the balloon 21 from protruding toward the outside of the balloon-launching chamber 32 from the balloon-launching port 321 when the balloon 21 being connected to the canister 41 is inflated.

Figure 8:
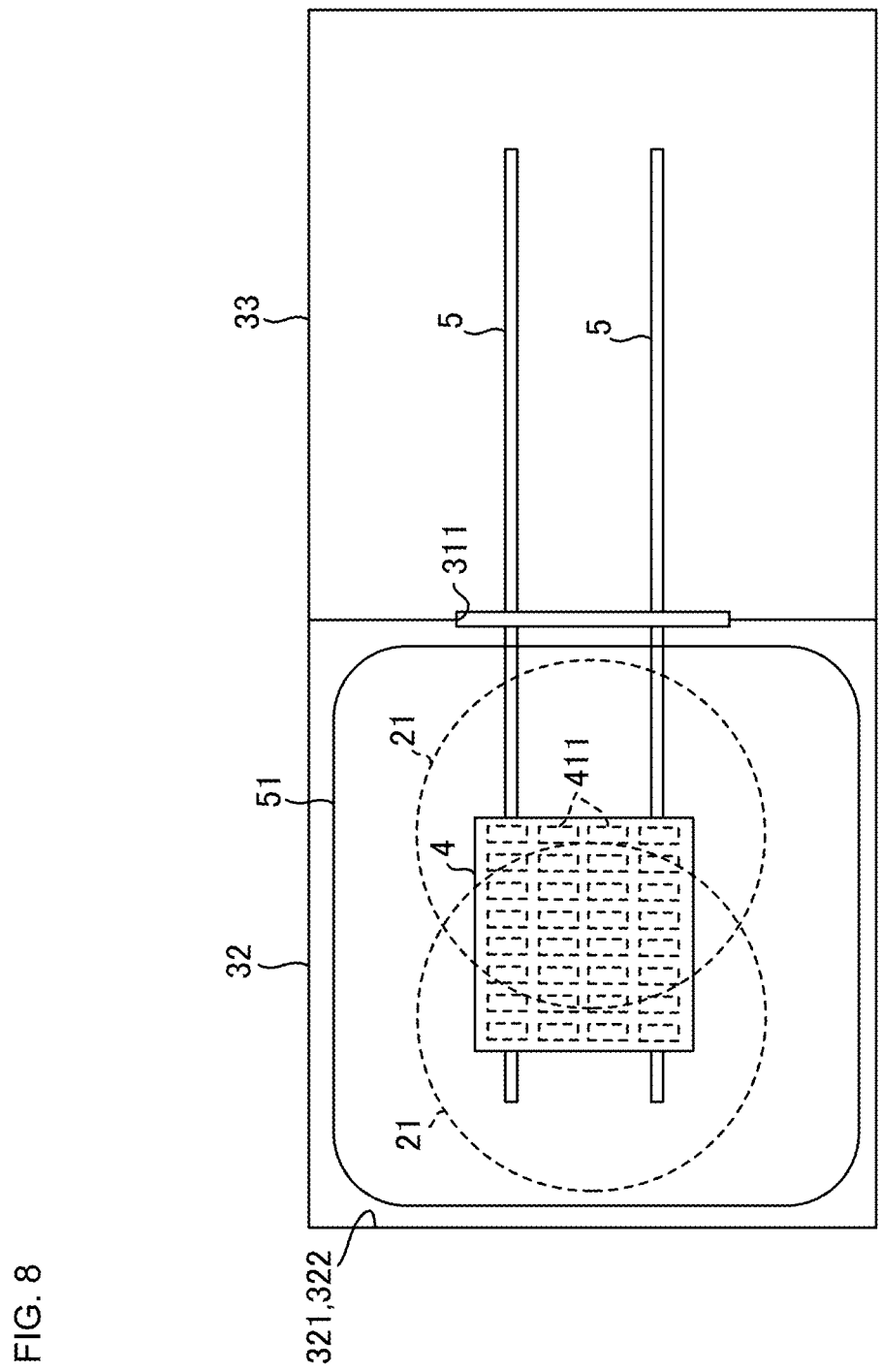
FIG. 8 is a plan view schematically illustrating the size of the canister module relative to a balloon-launching chamber.

FIG. 8 is a plan view schematically illustrating the size of the canister module 4 relative to the balloon-launching chamber 32.

The canister module 4 is placed at the center of the balloon-launching chamber 32. All the openings 411 of the canisters 41 are positioned within the balloon-launching port 321 in a planar view. A sufficient space is present between the canister module 4 and the inner walls 322 of the balloon-launching chamber 32. This can prevent the balloon 21 from coming in contact with the inner walls 322 of the balloon-launching chamber 32 and thus receiving a large force when the canister 41 positioned at the outermost circumference of the canisters 41 arranged in a matrix shape inflates the balloon 21.

Hereinafter, balloon-launching control performed by the PLC 332 in the preparation chamber 33 will be described.

Figure 9:
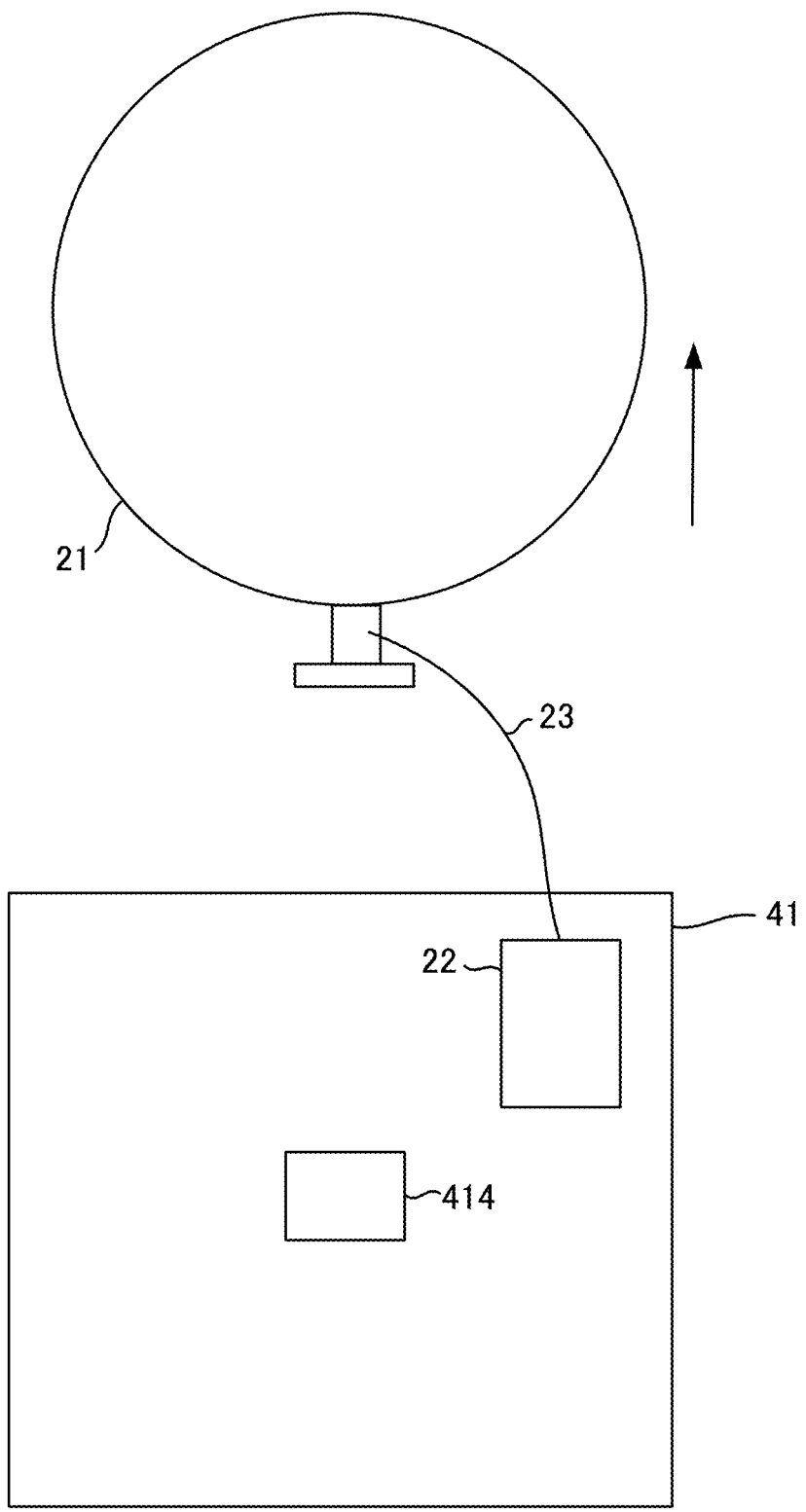
FIG. 9 is a schematic view illustrating a state in which a balloon is separated off from the canister.

The PLC 332 controls the balloon-launching apparatus 1 so that one balloon is launched at a fixed time once a day, for example. At this time, the PLC 332 first drives the driving mechanism 36 to open the sliding roof 323. Subsequently, the PLC 332 drives the opening and closing cylinder 431 to open the cover 412 of the canister 41 and opens the pneumatic valve 432 to fill the balloon 21 with hydrogen. The balloon 21 is inflated in the balloon-launching chamber 32 with the balloon 21 being connected to the pull-out mechanism 414 of the canister 41. Once the balloon 21 obtains the predetermined amount of buoyancy, the pull-out mechanism 414 is actuated to separate off the balloon 21 (FIG. 9).

Consequently, the balloon 21 lifts above the canister 41 while hanging the radiosonde 22. The balloon 21 is then launched from the inside of the balloon-launching chamber 32 to the outside of the balloon-launching chamber 32 through the balloon-launching port 321. The balloon 21 obtains observed information such as atmospheric temperature and wind direction in the sky, and wirelessly transmits the observed information to the receiver 333 in the preparation chamber 33. After the launching of the balloon 21, the PLC 332 drives the driving mechanism 36 to close the sliding roof 323. The PLC 332 launches the balloon 21 again in the same manner as the above from another canister 41 at the fixed time on the next day.

In this embodiment, the balloons 21 can be launched and observation can be thus continued until all the canisters 41 become empty as a result of balloon launching. Once all the canisters 41 become empty, an operator comes to the balloon-launching apparatus 1 and removes the lower end of the net 51 from the rail 53. After that, the operator moves the canister module 4 to the preparation chamber 33. The operator then replaces the canisters 41 with new canisters 41 in which the balloons 21 are disposed. After that, the operator places the canister module 4 again in the balloon-launching chamber 32, and connects the lower end of the net 51 to the rail 53. This again enables the balloon-launching apparatus 1 to perform observation automatically without the assistance of an attendant.

The balloon-launching apparatus 1 of this embodiment can provide the following advantageous effects.

The canisters 41 are arranged in a matrix shape in this embodiment. This can reduce the creation of dead space in the canister module 4 even when a large number of the canisters 41 are disposed. Therefore, this embodiment can reduce an increase in the size of the canister module 4 and thus an increase in the size of the balloon-launching apparatus 1.

Since the canisters 41 each capable of being placed independently are used in this embodiment, the number of the canisters 41 can be changed as desired.

During the balloon launching in which the sliding roof 323 is opened, rain or snow, for example, may enter the balloon-launching chamber 32. If the rain or snow wets the balloons 21 not being launched in the other canisters 41, adverse effects may be generated when such balloons 21 are inflated or the degradation of the balloons 21 may occur. Moreover, if the rain or snow wets the inner walls 223 of the balloon-launching chamber 32, trouble may occur, e.g., the balloon 21 may be stuck to the inner walls 223 when the balloon 21 abuts against the inner walls 223 during the inflation of the balloon 21.

The cover 412 is attached to the canister 41 in this embodiment. This can prevent the occurrence of adverse effects due to the wetting of the balloon 21.

The net 51 having a small area of contact with the balloon 21 is set up around on the inner side of the inner walls 322 of the balloon-launching chamber 32 in this embodiment. This can prevent the balloon 21 from being stuck to the inner walls 322.

In this embodiment, the canister module 4 can be conveyed to the preparation chamber 33 by the carriage 6, and the maintenance of the canister 41 can be performed in the preparation chamber 33. Thus, the preparation chamber 33 can be used as a space for operations relating to various observations in this embodiment and such a space is convenient.

In addition to the increase in the size of the apparatus described in Background Art, the conventional balloon-launching apparatus has the following problems. In the conventional balloon-launching apparatus, the cartridges for holding the balloons are placed evenly in the circumferential direction of the rotary table. At a position where each cartridge is placed on the rotary table, a lifting and lowering mechanism for the cartridge is provided. A single balloon-launching cylinder is provided above the rotary table.

To launch the balloon, the rotary table is driven once intermittently to send the cartridge to immediately below the balloon-launching cylinder. The lifting and lowering mechanism lifts the cartridge to position the cartridge in the balloon-launching cylinder. The cartridge fills the balloon with hydrogen and separates off the balloon. This causes the balloon to be launched from an opening in an upper part of the balloon-launching cylinder to the outside of the balloon-launching apparatus. The lifting and lowering mechanism lowers the cartridge having launched the balloon and returns the cartridge to its original position again on the rotary table. In the following balloon launching, the balloon-launching apparatus drives the rotary table once intermittently to position the cartridge next to the empty cartridge directly below the balloon-launching cylinder. The balloon-launching apparatus repeats the above-described steps again.

In the conventional balloon-launching apparatus, the balloon may remain in the balloon-launching cylinder due to the occurrence of trouble such as the balloon being stuck to the inside of the balloon-launching cylinder during the operation of launching the balloon. If the balloon remains in the balloon-launching cylinder, the positioning of the next cartridge in the balloon-launching cylinder cannot cause the cartridge to launch the balloon normally. Thus, if the operation of launching the balloon has trouble in the conventional balloon-launching apparatus, the operation of launching the balloon by the next cartridge is stopped until an operator comes to the balloon-launching apparatus and solves the trouble.

Depending on the place where the balloon-launching apparatus is placed, however, several days are needed for an operator to arrive when trouble occurs. Thus, the conventional balloon-launching apparatus has a risk of stopping the observation for an extended period of time when trouble occurs. Moreover, the conventional balloon-launching apparatus needs to position the cartridge immediately below the balloon-launching cylinder accurately, and thus requires high machine accuracy.

In this embodiment, the balloons 21 can be launched independently from the canisters 41. Thus, even when trouble occurs in balloon launching from one canister 41, the balloon can be launched from another canister 41. This can improve the continuity of the observation.

In this embodiment, the openings 411 of all the canisters 41 are positioned inside the balloon-launching port 321 of the balloon-launching chamber 32 in a planar view. This allows for balloon launching from any canister 41 without moving the canisters 41 from their installation sites. This embodiment can thus eliminate the need for high machine accuracy that is required when the canister 41 is moved to a balloon-launching position.

(Modified Examples)

It is only required that the canisters 41 are arranged regularly in a lattice shape (matrix shape) in a plane, and it is not required that the numbers of the canisters 41 in the columns are equal to one another as in this embodiment. For example, in the canister module 4 of FIG. 3, the number of the canisters 41 on the rightmost column on the plane of paper may not be eight as in this embodiment but may be seven.

In this embodiment, the canisters 41 are provided as separate bodies. However, a plurality of canisters may be integrally provided, and canisters adjacent to each other may share the partition.

In this embodiment, the housing section is the canister 41 to which the cover 412 is attached. However, it is only required that housing sections each capable of housing the balloon 21 and independently launching the balloon are arranged in a matrix shape. Thus, the cover 412 may not be attached to the housing section.

The inside of the container 3 may be divided by partitions into three or more. Alternatively, it may not be divided by any partition.

REFERENCE SIGNS LIST

1 . . . balloon-launching apparatus
3 . . . container
5 . . . rail
6 . . . carriage (moving mechanism)
21 . . . balloon
31 . . . partition
32 . . . balloon-launching chamber
33 . . . preparation chamber
34 . . . top surface
41 . . . canister (housing section)
42 . . . frame (holding member)
43 . . . pallet (holding member)
51 . . . net
311 . . . opening (communicating opening)
321 . . . balloon-launching port
411 . . . opening
412 . . . cover
415 . . . opening and closing mechanism

The invention claimed is:

1. A balloon-launching apparatus comprising:
a plurality of housing sections each formed in a box shape having an opening that opens in an upper part thereof and configured to house a balloon and launch the balloon from the opening, the plurality of housing sections being arranged in a matrix shape;
a container configured to house the plurality of housing sections and include a balloon-launching port provided above the plurality of housing sections,
wherein all the openings are positioned within the balloon-launching port in a plan view and the balloon-launching port launches the balloon that each of the plurality of housing sections launches toward an outside; and
a net suspended from an inner side of the balloon-launching port toward an outer side of a group of the openings arranged in the matrix shape.

2. The balloon-launching apparatus according to claim 1, wherein the canisters are each capable of being disposed independently, and the canisters are respectively configured to be driven to open and close the openings.

3. The balloon-launching apparatus according to claim 2, further comprising:
the container having a balloon-launching chamber and a preparation chamber divided by a partition, the container including a communicating opening provided below the partition that allows the balloon-launching chamber and the preparation chamber to be in communication with each other, and the balloon-launching port provided on a top surface of the balloon-launching chamber that launches the balloon toward an outside;
a rail extending over the balloon-launching chamber and the preparation chamber through the communicating opening;
a pallet on which the frame is placed; and
a moving mechanism that moves the pallet along the rail.

4. A balloon-launching apparatus comprising:
a plurality of canisters each formed in a box shape having an opening that opens in an upper part thereof and configured to house a balloon and launch the balloon from the opening, the canisters being arranged in a matrix shape, and configured to be driven to open and close the openings and being disposed independently;
a container having a balloon-launching chamber and a preparation chamber divided by a partition, the container including a communicating opening provided below the partition that allows the balloon-launching chamber and the preparation chamber to be in communication with each other, and a balloon-launching port provided on a top surface of the balloon-launching chamber that launches the balloon toward an outside;
a rail extending over the balloon-launching chamber and the preparation chamber through the communicating opening;
a holding member comprising a pallet and a frame placed on the pallet, the frame having fitting opening portions in which the canisters are fitted respectively and integrally holding the canisters; and
a moving mechanism that moves the pallet along the rail.

5. The balloon-launching apparatus according to claim 4, wherein all the openings are positioned within the balloon-launching port in a plan view and the balloon-launching port launches the balloon, that each of the canisters launches, to an outside of the balloon-launching apparatus.

6. The balloon-launching apparatus according to claim 5, further comprising a net suspended from an inner side of the balloon-launching port toward an outer side of a group of the openings arranged in the matrix shape.

\* \* \* \* \*